Patented Jan. 16, 1934

1,943,727

UNITED STATES PATENT OFFICE 1,943,727

AZO-DYESTUFF

Richard Fleischhauer, Frankfort-on-the-Main-Fechenheim, Germany, assignor to General Aniline Works, Inc., New York, N. Y., a corporation of Delaware No Drawing. Application May 12, 1932, Serial No. 610,980, and in Germany May 22, 1931

3 Claims. (Cl. 260—70)

In U. S. Patent No. 1,901,390, dated March 14, 1933, black azo-dyestuffs are described which are obtainable by coupling with a 1-amino-8-hydroxy-naphthalene sulfonic acid 2 molecular proportions of diazotized amines of the benzene series which contain a nitro- or acylamino-group and at least one of which contains in the ortho-position to any of the nitrogenous groups a hydroxy, carboxy or ether group, by converting the nitro- or acylamino-groups of the disazo-dyestuff formed into amino-groups in the known manner (i. e. by reduction or saponification respectively), tetrazotizing the product and combining the tetrazo compound with two molecular proportions of coupling components, each of which contains two auxochromic groups in the meta-position to one another. The said specification describes specifically only diazo compounds in which the nitrogenous groups are in the para-position to one another.

The present invention relates to further dyestuffs of these series which are characterized by the fact that the nitrogenous groups of at least one of the diazo compounds are in the meta-position to one another. These new dyestuffs correspond probably to the general formula

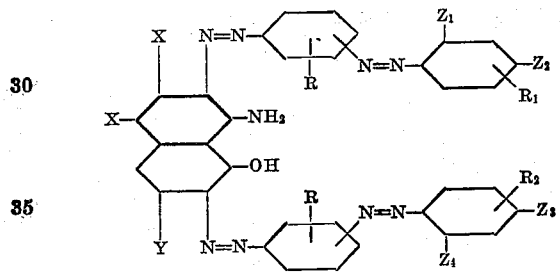

wherein one X means hydrogen, the other X a sulfonic acid group, Y hydrogen or a sulfonic acid group, one R hydrogen, an alkoxy, hydroxy or carboxylic acid group, the other R an alkoxy, hydroxy or carboxylic acid group, $Z_1$, $Z_2$, $Z_3$, $Z_4$ mean amino- or hydroxy groups which may be substituted by alkyl, aralkyl, aryl of benzene series, and $R_1$ and $R_2$ mean hydrogen, alkyl, phenyl, halogen, sulfonic or carboxylic acid groups and wherein the azo groups of at least one benzene nucleus stand in meta-position to one another.

In comparison with the dyestuffs specifically described in the examples of the copending application Serial No. 486,052, the dyestuffs of the present invention exhibit more greenish shades, but the same good properties of fastness when after-treated with an aldehyde and a copper salt.

In order to further illustrate my invention, the following examples are given the parts being by weight and all temperatures in centigrade degrees; but I wish it however to be understood that my invention is not limited to the particular products nor reaction conditions mentioned therein:

Example 1

13.8 parts of para-nitraniline are diazotized in the usual manner and the diazo compound is combined in an acid medium with 31.9 parts of 1-amino-8-hydroxy-naphthalene-4.6-disulfonic acid. The mono-azo-dyestuff is combined in a solution rendered alkaline by means of sodium carbonate with the diazo compound of 16.8 parts of 4-nitro-2-amino-1-anisol. The diazo-dyestuff is isolated and then reduced with a solution of about 72 parts of crystallized sodium sulfide. The reduced dyestuff is isolated by means of common salt and hydrochloric acid and then tetrazotized in an aqueous suspension with a solution of 14 parts of sodium nitrite and with an excess of hydrochloric acid. The suspension is introduced into a solution containing 22 parts of metaphenylene-diamine and an excess of sodium carbonate. The new dyestuff thus obtained is isolated by the addition of common salt. It corresponds probably to the formula:

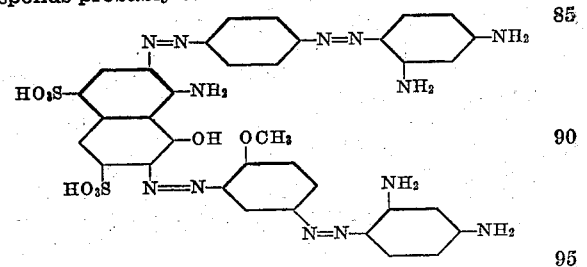

It forms when dry a black-bronze powder soluble in water, dyeing cotton black shades which become more greenish and faster to light when after-treated with formaldehyde and copper salts in the manner described in Example 4 of U. S. application Serial No. 486,052/30.

By using in the above example instead of p-nitraniline the same quantity of m-nitraniline or instead of 4-nitro-2-amino-anisole, 4-nitro-2-amino-1-phenol, products of similar properties are obtained.

Instead of metaphenylene-diamine its substitution products and also any other end-components, containing two identical or different auxochromic groups in the meta-position as for example resorcinol, meta-amino-phenol and their substitution products may be used. Such substitution products are for instance: 4-methyl- (or chloro- or phenyl-) 1.3-diamino-benzene, 1.3-diamino-benzene-4-sulfonic (or -4- or -5-carboxylic or -4-acetic) acid, tetra-amino-carbazole, 3-amino-phenyl-1-amino-acetic acid, 3-amino-phenyl-1-oxamic acid, 1-amino-3-oxethylamino- (or mono- or dimethyl-amino- or phenyl-amino-) benzene or the corresponding substitution products of 3-amino-phenol or resorcinol.

Similar dyestuffs are obtained by replacing 1-amino-8-hydroxy-naphthalene-4.6-disulfonic acid by 1-amino-8-hydroxy-naphthalene-3.6-disulfonic acid.

Example 2

19.4 parts of 2-acetylamino-4-amino-benzoic acid are diazotized in the usual manner and combined in an acidic medium with 31.9 parts of 1-amino-8-hydroxy-naphthalene-4.6-disulfonic acid. Into the solution of this mono-azo-dyestuff, rendered alkaline with sodium carbonate, a diazo solution of 15 parts of 4-acetyl-amino-1-amino-benzene is introduced. The disazo-dyestuff is filtered off and saponified by heating it with a 10% caustic soda solution. The diamino-disazo-dyestuff is tetrazotized in the manner described in Example 1. The suspension of the tetrazo compound is neutralized with sodium acetate and mixed with an aqueous solution of 10.9 parts of 1.3-diamino-benzene.

Thereto a solution containing an excess of sodium carbonate and 11 parts of resorcinol is added. The dyestuff is isolated in the customary manner. It corresponds probably to the formula

[structural formula]

It forms when dry a dark powder soluble in water, dyeing vegetable fibers blackish green shades, becoming more bluish and faster to light when after-treated with formaldehyde and copper salts.

By combining the tetrazo compound obtained as above with 2 molecules of resorcinol or meta-amino-phenol, products are obtained dyeing still more greenish shades.

Example 3

The diazo compound of 18 parts of 2-acetylamino-5-amino-1-anisol is combined in a feebly acid medium with 31.9 parts of 1-amino-8-hydroxy-naphthalene-4.6-disulfonic acid and the mono-azo-dyestuff is combined in the presence of an excess of sodium carbonate with the diazo compound of 15 parts of 3-acetyl-amino-1-amino-benzene. The blue disazo-dyestuff is isolated, saponified with a 10% caustic soda lye, again isolated, and then tetrazotized. The free mineral acid is neutralized by the addition of a sodium acetate solution and the mass is mixed, while cooling with ice, with a neutral solution of about 10 parts of meta-phenylene-diamine. When a test shows that the phenylene-diamine has disappeared, an aqueous solution of about 11 parts of resorcinol and an amount of sodium carbonate sufficient for keeping the mass alkaline are added. The dyestuff thus produced corresponds probably to the formula

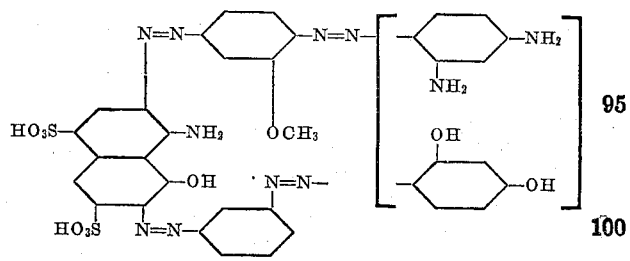

It represents when dry a black-bronze powder, soluble in water, dyeing vegetable fibers greenish black shades, which become faster to washing and light when after-treated with formaldehyde and copper salts.

Example 4

The diazo solution of 18 parts of 2-acetylamino-4-amino-1-anisol is combined in an acidic medium with 23.9 parts of 1-amino-8-hydroxy-naphthalene-4-sulfonic acid and the monoazo-dyestuff is again combined in the presence of sodium carbonate with the diazo compound from 18 parts of the same diazo component. The isolated disazo-dyestuff is saponified by means of a caustic soda lye of about 10% strength and then tetrazotized as described above. The suspension of the tetrazo compound is combined in the presence of sodium carbonate with 22 parts of resorcinol. The dyestuff thus produced corresponds probably to the formula

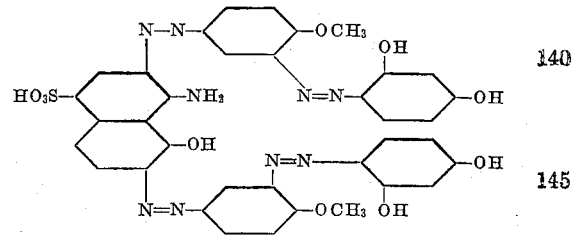

It represents a black water-soluble powder dyeing cotton dark olive-green shades, becoming olive brown and faster to light when after-treated with formaldehyde and copper salts.

I claim:—

1. The azo-dyestuffs of the probable general formula

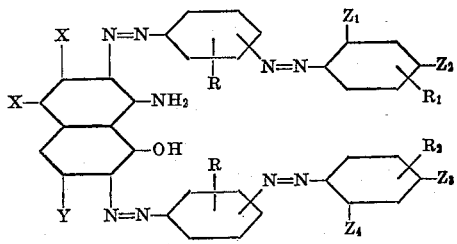

wherein one X means hydrogen, the other X a sulfonic acid group, Y hydrogen or a sulfonic acid group, one R hydrogen, an alkoxy, hydroxy, or carboxylic acid group, the other R an alkoxy, hydroxy or carboxylic acid group, $Z_1$, $Z_2$, $Z_3$, $Z_4$ mean amino- or hydroxy groups which may be substituted by alkyl, aralkyl, aryl of benzene series, and $R_1$ and $R_2$ mean hydrogen, alkyl, phenyl, halogen, sulfonic or carboxylic acid groups and wherein the azogroups of at least one benzene nucleus stand in meta-position to one another, said compounds representing when dry black powders soluble in water and dyeing vegetable fibers greenish black shades, which become fast to washing and light when after-treated with formaldehyde and copper salts.

2. The azo-dyestuff of the probable formula

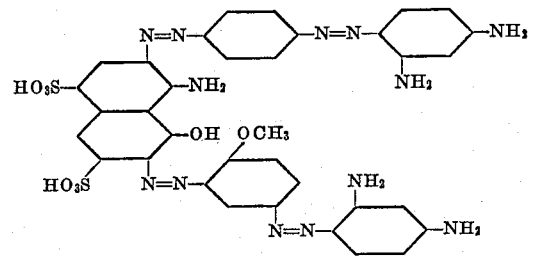

said compound representing when dry a black powder soluble in water and dyeing vegetable fibers greenish black shades, which become fast to washing and light when after-treated with formaldehyde and copper salts.

3. The azo-dyestuff of the probable formula

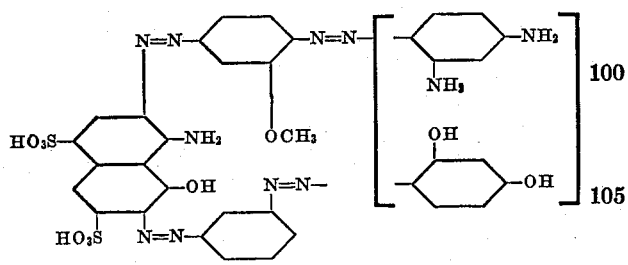

said compound representing when dry a black powder soluble in water and dyeing vegetable fibers greenish black shades, which become fast to washing and light when after-treated with formaldehyde and copper salts.

RICHARD FLEISCHHAUER.